(12) United States Patent
Maynard et al.

(10) Patent No.: US 7,500,235 B2
(45) Date of Patent: Mar. 3, 2009

(54) TECHNIQUE FOR UPDATING A RESIDENT APPLICATION AND ASSOCIATED PARAMETERS IN A USER TERMINAL THROUGH A COMMUNICATIONS NETWORK

(75) Inventors: Stephen L. Maynard, Arvada, CO (US); Jed A. Reed, Westminster, CO (US); John W. Callahan, Broomfield, CO (US); Benjamin L. Payne, Westminster, CO (US)

(73) Assignee: AOL Time Warner Interactive Video Group, Inc., Ny, NY (US)

( * ) Notice: Subject to any disclaimer, the term of this patent is extended or adjusted under 35 U.S.C. 154(b) by 660 days.

(21) Appl. No.: 10/655,655

(22) Filed: Sep. 5, 2003

(65) Prior Publication Data

US 2005/0055685 A1    Mar. 10, 2005

(51) Int. Cl.
*G06F 9/44* (2006.01)
(52) U.S. Cl. ........................ 717/172; 717/171; 717/173
(58) Field of Classification Search .......... 717/170–173
See application file for complete search history.

(56) References Cited

U.S. PATENT DOCUMENTS

| 5,666,293 | A | * | 9/1997 | Metz et al. ................... 709/220 |
| 6,480,891 | B1 | * | 11/2002 | Chernyak et al. ........... 709/223 |
| 6,904,611 | B1 | * | 6/2005 | Poli et al. .................... 725/132 |
| 7,120,926 | B1 | * | 10/2006 | Safadi et al. ................ 725/132 |
| 2002/0124243 | A1 | * | 9/2002 | Broeksteeg et al. ......... 717/168 |
| 2004/0047364 | A1 | * | 3/2004 | Briggs et al. ................ 370/463 |

* cited by examiner

*Primary Examiner*—Tuan Q Dam
*Assistant Examiner*—Zheng Wei
(74) *Attorney, Agent, or Firm*—Straub & Pokotylo; Michael P. Straub; Ronald P. Straub

(57) ABSTRACT

A resident application (RA) in set-top terminals (STTs) is updated by providing an upgrade channel application (UCA) over a network. Those STTs that are selected to receive the UCA are identified. The selected STTs download the UCA from the network. Once the UCA begins to execute on an STT, it retrieves the user parameters stored in the STT, and transmits them to a remote location for storage. A new RA is then installed in the STT. The original user parameters are converted at the remote location to become compatible with the new RA. The converted user parameters are transferred to the STT for use by the new RA.

50 Claims, 7 Drawing Sheets

| | MAC ADDRESS ⌐573 | USER PARAMETER #1 ⌐574 | USER PARAMETER #2 ⌐575 | USER PARAMETER #3 ⌐576 | USER PARAMETER #4 ⌐577 |
|---|---|---|---|---|---|
| 560A | MAC ADDRESS STT 170-1 | PARENTAL-BLOCKING PARAMETERS | SERVICE PARAMETERS | FAVORITE CHANNEL PARAMETERS | RECORDING PARAMETERS |
| 560B | X | X | X | X | X |
| 560C | X | X | X | X | X |
| 560D | X | X | X | X | X |
| 560E | X | X | X | X | X |

540

TECHNIQUE FOR UPDATING A RESIDENT APPLICATION AND ASSOCIATED PARAMETERS IN A USER TERMINAL THROUGH A COMMUNICATIONS NETWORK

FIELD OF THE INVENTION

The invention relates to communications systems and methods, and more particularly to a system and method for updating software applications in user terminals in a communications network, e.g., a cable network.

BACKGROUND OF THE INVENTION

A set-top terminal (STT) serves as a gateway between a user's television and the cable feed carrying incoming signals. An STT receives, from a cable network, encoded signals containing programming content, decodes the signals, and converts them into analog signals displayable by the television. The STT also accepts commands from the user relating to the user's choices for programming and services.

Typically, an STT includes an operating system and one or more resident applications (RAs) stored in memory. An RA may comprise one or more software routines, and provides functionality to the STT when the RA is executed. For example, an RA may provide a parental-blocking function that enables a user to block the viewing of selected programs or channels based on one or more factors including rating, channel, or time. Other functions that may be incorporated in an RA include an interactive program guide (IPG) that displays television program information, including program name, start time and duration, and a navigator that can be used to select services and applications offered over the cable network.

Many RAs record various aspects of the STT user's behavior. For example, a parental-blocking application may record data indicating which programs or channels the user wishes to have blocked. An RA may also record a user's program choices and keep track of the user's favorite programs or channels. Data relating to user choices and preferences (such data being referred to as "user parameters") are stored in memory in the STT so that the RA may access the data and optimize its functionality to the user.

In many cable networks, the cable operator periodically updates the RA that resides in one or more STTs to improve the STT's functionality or to provide new services. This is ordinarily accomplished by broadcasting an updated version of the RA over the network from the cable operator's headend facility to one or more STTs. The STTs receive the updated RA and download it into memory. The updated RA is typically a modified version of the original RA stored in the STTs. Additionally, because software errors and other problems are sometimes discovered in the process of introducing an updated RA, it is sometimes preferable to conduct a trial of the updated RA on a limited number of STTs in the network before installing it on all STTs.

Many cable operators avoid replacing an existing RA with an entirely new RA, because this process can result in a loss of the user parameters that are stored in the STT memory. Typically, when a respective RA generates and stores user parameters in the STT memory, the user parameters are formatted and organized in a manner specific to the respective RA, and cannot be read or interpreted by a different RA. As a consequence, the process of installing a new RA can result in the new RA being unable to read or interpret correctly the user parameters that are stored in the STT memory. In such a case, installing the new RA may result in the loss of information such as, for example, parental blocking choices, in which case any program may become viewable on the user's television from the moment the new RA is downloaded and executes. In many cases, the only solution is for the user to re-enter his or her choices and preferences in accordance with the new RA's user interface. Such a loss of user preferences is unacceptable to many users (and to many cable operators).

SUMMARY OF THE INVENTION

The invention is premised upon a recognition of a need for updating an RA that resides in one or more STTs while preserving the user preferences stored, in the form of user parameters, in the STT memory. In accordance with the invention, when an RA in an STT is updated, the user parameters associated with the RA are sent from the STT to a remote location, e.g., the headend facility. The received parameters are stored in association with an identifier of the STT to facilitate a possible roll-back to the original RA. A version of the parameters is derived from the received parameters, which is compatible with an updated version of the RA. The updated version of the RA is installed in the STT, and the new version of the parameters is provided to the STT as well.

In accordance with an aspect of the invention, an application facilitating the communications of the user parameters between an STT and the remote location is downloaded to the STT by "force-tuning" the STT to a selected program channel. To that end, the STT includes a database for associating the selected program channel with a service of downloading the application. A message, e.g., formatted in accordance with an Emergency Alert System (EAS) message format, is sent to the STT to direct the STT to access the selected program channel, thereby causing the STT to consult the database to learn the service associated with the selected program channel. The STT then requests the service to accomplish the downloading of the application.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 7 illustrates the data structure of a user parameter database;

DETAILED DESCRIPTION

Figure 1:
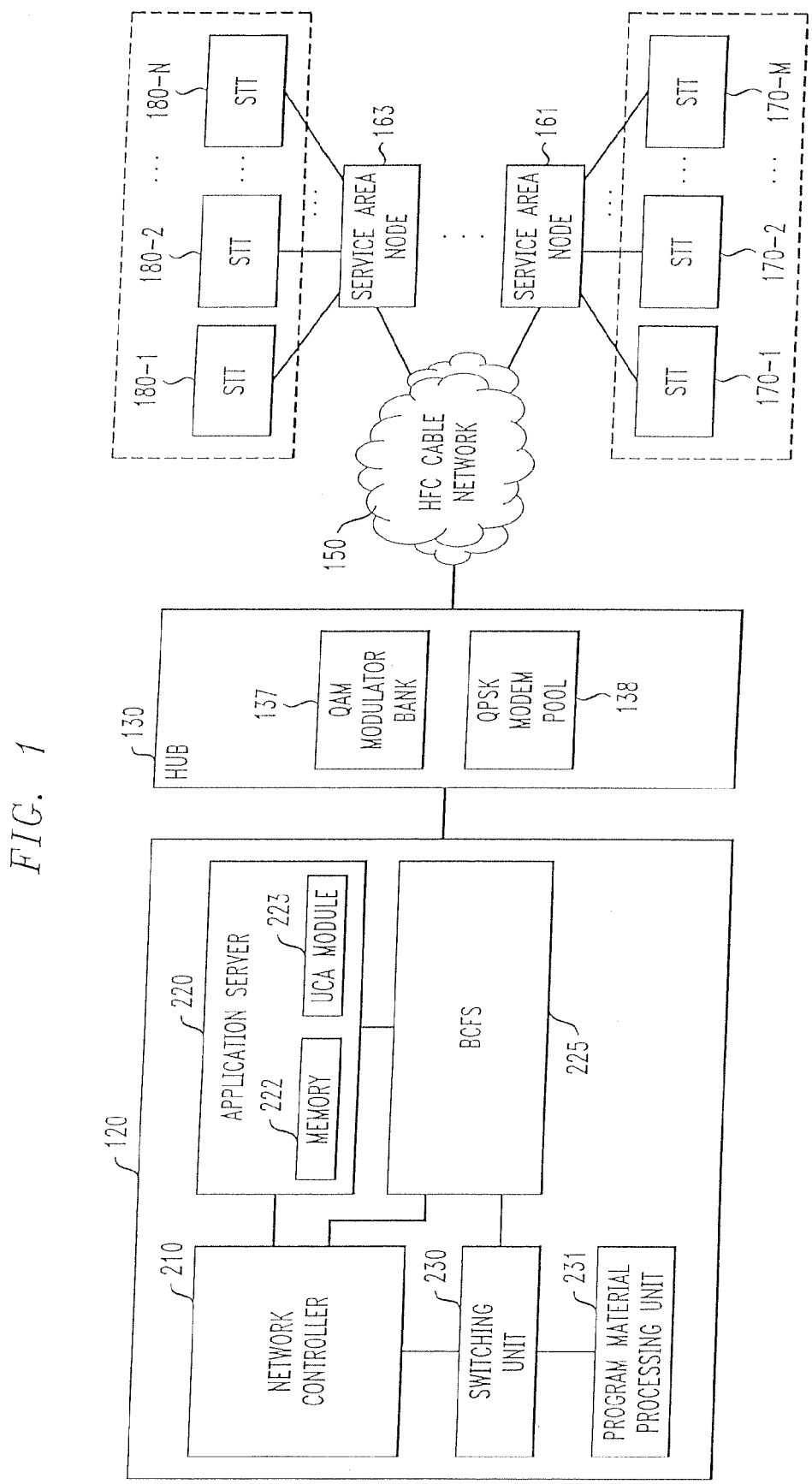
FIG. 1 illustrates components of a broadband communications system.

FIG. 1 illustrates components of a broadband communications system, e.g., a cable system. Headend 120 receives incoming programming attributed to various program channels, and provides cable television services to STTs including STTs 170 and 180. It should be noted at this point that the terms "transmission channel" and "program channel" should not be confused. A "transmission channel" signifies a designated frequency band through which a transport stream containing broadcast programs and/or data is transmitted. A "program channel" signifies the source of program material or the service selected by a user to view. For example, a user may select program channel 2 to view a program channel provided by CBS, program channel 14 to view a program channel provided by ESPN, etc.

In a conventional manner, headend 120 broadcasts programming content downstream to STTs 170 and 180. Headend may also transmit to users data concerning system messages. Quadrature amplitude modulation (QAM) modulators and quaternary phase-shift keying (QPSK) modems in hub 130 modulate and format program streams and data received from headend 120 and transmits the modulated signals through network 150. In this instance, network 150 is a multichannel delivery network comprises well-known hybrid fiber coaxial (HFC) cable network.

As shown in FIG. 1, STTs 170 and 180 are connected to network 150 and receive program broadcasts, as well as data, e.g., control information, emergency information, etc. STTs 170 represent a first group of M STTs in a service area or neighborhood, where M represents an integer. Likewise, STTs 180 represent a second group of N STTs in another service area or neighborhood, where N represents another integer. One or more service area nodes (e.g., 161, 163) function as an interface between the STTs and network 150.

Programming content is broadcast from headend 120 to STTs 170 and 180 through "in-band" transmission channels. These transmission channels may be 6 MHz bands populating a forward passband, e.g., 350-750 MHz band, of a coaxial cable, which is allocated for downstream communication from headend 120 to STTs 170 and 180. QAM modulator bank 137 in hub 130 modulates the downstream communication onto selected in-band channels in accordance with a QAM scheme.

In addition to the in-band channels, downstream data may be communicated from headend 120 to STTs 170 and 180 via one or more forward data channels (FDCs). FDCs, sometimes referred to as "out-of band" channels, typically are used to transport data, e.g., system messages, to STTs 170 and 180. The FDCs may occupy the 70-130 MHz band of a coaxial cable. QPSK modem pool 138 in hub 130 modulates downstream data onto selected FDCs in accordance with a QPSK scheme.

Upstream data is transmitted from STTs 170 and 180 to headend 120 via one or more reverse data channels (RDCs), which occupy a reverse passband, e.g., 5-40 MHz band, of a coaxial cable. Data carried in the reverse data channels is modulated in accordance with a QPSK scheme. Hub receives the QPSK signals in the RDC and performs any necessary demodulation before transmitting the signals to headend 120.

STTs 170 and 180 may utilize a reverse data channel for sending application data, control messages, file requests, etc. Using a contention-based access mechanism established by the Digital Audio Visual Council (DAVIC), a standard setting organization, each STT can share an RDC with other STTs in the network. This mechanism enables an STT, e.g., STT 170-1, to transmit upstream messages without a dedicated connection to a QPSK demodulator. The mechanism also provides equal access to the STTs that share the RDC, and enables detection and recovery from reverse path collisions that occur when two or more of the STTs transmit an upstream message simultaneously. As also specified by DAVIC, for communications purposes, each STT and network controller 210 are identified by the Internet protocol (IP) addresses assigned thereto. However, these IP addresses may be randomly assigned each time the broadband communication system is reconfigured. As a result, the IP address of an STT or that of network controller 210 may change after a system reconfiguration. Nevertheless, each STT and network controller 210 are also assigned a media access control (MAC) address on a permanent basis, surviving any system reconfiguration.

Headend 120 includes program material processing unit 231, application server 220, network controller 210, switching unit 230, and broadcast carousel file server (BCFS) 225. In a well-known manner, program material processing unit 231 receives program materials from various sources attributed to different program channels, and processes the program materials to form individual program streams. Under control of network controller 210, the program streams are switched by switching unit 230 to appropriate modulators in QAM modulator bank 137 in hub 130, where the program streams are modulated onto the corresponding in-band transmission channels for broadcast to STTs 170 and 180 over network 150.

Application server 220 represents one or more server systems that provide software applications and services for STT users. For example, application server 220 may be a workstation comprising one or more software applications for providing database services, network management services, interactive program guide services, billing services, etc.

Memory 222 provides data storage capacity for application server 220. In this illustrated embodiment, memory 222 may be, e.g., a hard disk drive, which resides in application server 220. Alternatively, memory 222 may be an external storage device connected to application server 220.

BCFS 225 functions by repeatedly broadcasting, in a cyclical fashion, a data stream containing video, audio, data, codes, software applications, etc for STTs. In general, BCFS 225 is used to "trickle," or disseminate piecemeal, selected data items (such as program guide material) to STTs, which then assemble the data in their memory. In accordance with one embodiment, the output of BCFS 225 is transmitted via an in-band channel. Alternatively, the output of BCFS 225 is transmitted via an FDC. The rate of transmission via an in-band channel in general is relatively high because of a relatively wide bandwidth afforded to an in-band channel. However, the BCFS transmission may interfere with the transmission of programming content via the same in-band channel. On the other hand, the rate of transmission via an FDC is relatively low but the BCFS transmission would avoid the interference-related problems. The transmission channel utilized for BCFS output is referred to herein as the "BCFS channel."

An STT may download material (e.g., program guide data, a software application, etc.) from BCFS 225 by tuning to the BCFS channel and waiting until the material appears within the cyclical transmission from BCFS 225. If the STT tunes to the BCFS channel while the desired material is being broadcast, the STT may download one or more portions of the material and wait for the beginning of the material in the next cycle.

Figure 2:
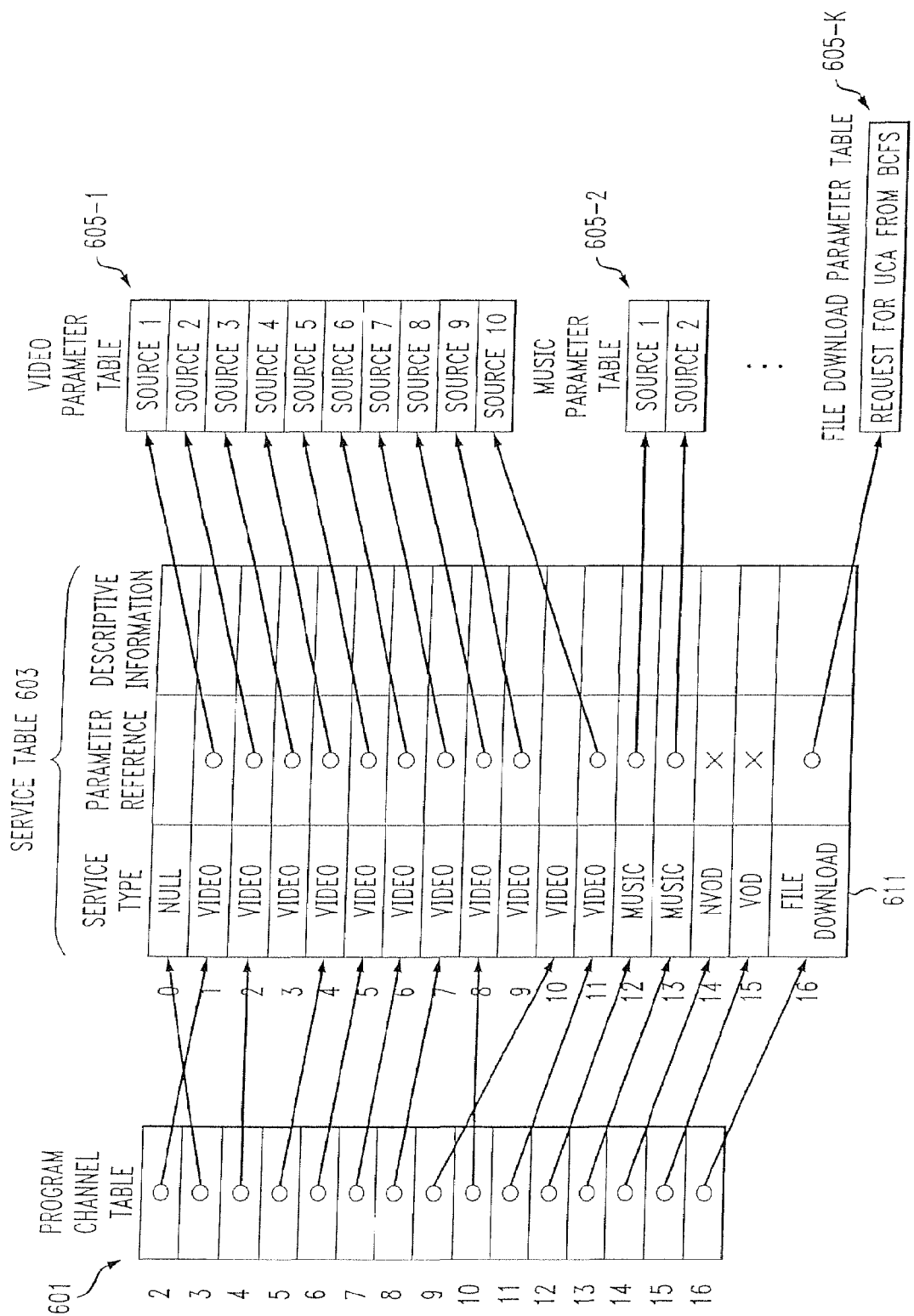
FIG. 2 shows schematically a program channel table, a service table, and associated parameter tables.

To facilitate the provision of broadcast services to STT users, BCFS 225 regularly broadcasts program channel and service related tables such as those shown in FIG. 2. These tables cross-reference program channels with a variety of television services, which can include various types of video and audio programming and online services. Transparent to STT users, selection of a program channel transfers control to a specific application program that, along with one or more appropriate parameters obtained from the cross-reference tables, activates (i.e., displays on the selected channel) the television service associated with that selected channel. The channel selection function advantageously enables an STT to process data from sources other than just traditional analog video broadcast sources. These other sources can include, for example, MPEG video, VBI, IP, and ROM.

Referring to FIG. 2, program channel table 601 associates program channels with services listed in service table 603. When an STT user selects a channel, that channel is first identified in program channel table 601 where a pointer associates the program channel with a particular service in service table 603. For example, program channel 2 is associated with service 1, program channel 4 is associated with service 2, and program channel 9 is associated with service 10.

Service table 603 indicates the type of service provided. For example, as shown in column 611, services 1-11 are video services, services 12 and 13 are music services, and service 14 is an NVOD service. Optionally, a program channel does not have to be associated with a service, in which case it is associated with a "null" service 0 (e.g., channel 3 is associated with service 0).

Parameter tables 605-1 through 605-K provide application parameters needed to activate the sources for various services. The content of sources for video services may include, for example, recently released movies, classic movies, science fiction programming, or weather information. Application parameters are used by an STT when executing application software, and may include the frequency of a particular source's signals or other more complex variables.

In sum, the program channel and service tables enable an STT to execute software and activate a variety of services. When an STT user selects a program channel, the STT identifies the type of service associated with the selected channel from channel table 601 and service table 603, and then executes the appropriate program or routine to access the service's source by referring to the appropriate parameter table, demodulating and deformatting the signal as necessary, and displaying the source's contents.

In accordance with one implementation, controller 210 updates the program channel and service tables, and transmits a message directing STTs to download the updated tables. In accordance with this implementation, the message also includes information indicating the directory location of the updated program channel and service tables in the BCFS channel stream.

Returning to FIG. 1, network controller 210 processes user requests for applications and services and controls the distribution thereof by application server 220 and BCFS 225. It should be noted that, although in the embodiment shown in FIG. 1, BCFS 225 is separate from network controller 210, in another embodiment, BCFS 225 may be incorporated into, and function as part of, network controller 210.

Figure 3:
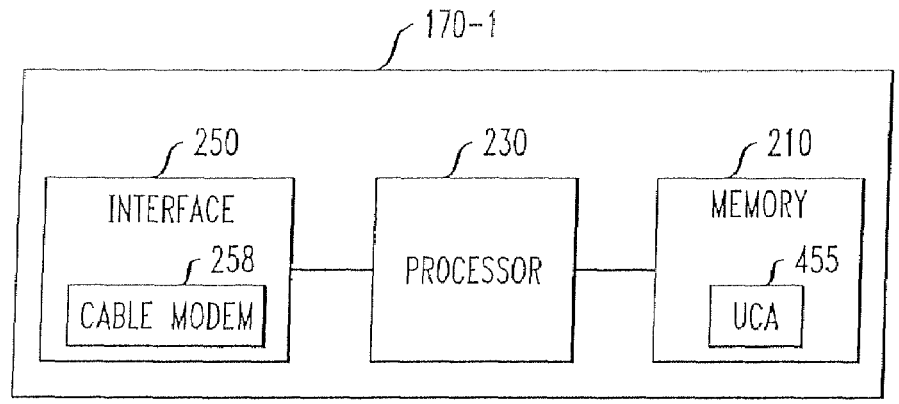
FIG. 3 illustrates components of a set-top terminal.

FIG. 3 illustrates components of a generic STT (e.g. 170-1), which include, among others, processor 230, interface 250 and memory 210. Processor 230 orchestrates the operations of STT 170-1. Interface 250 includes cable modem 258 capable of receiving in-band channels and FDCs from, and transmitting RDCs to, network 150. Interface 250 also performs any well-known modulation, demodulation or formatting that is necessary to transmit or receive programming content and data.

Memory 210 stores a variety of software applications and data. For example, the STT operating system, which provides the basic functionality for STT 170-1, is stored in memory 210. A software application received from headend 120, such as an RA, may also be stored in memory 210. Memory 210 additionally stores data representing user parameters generated by the RAs. Memory 210 may be, e.g., a non-volatile random-access memory.

In many cable networks, the cable operator updates from time to time the RA to improve its functionality or to provide new services. In prior art networks, many cable operators avoid replacing an existing RA with an entirely new RA, because this process can result in the loss of information representing user choices and preferences. Typically, when a given RA generates and stores user parameters in the STT memory, the user parameters are formatted and organized in a manner specific to the respective RA, and cannot be read or interpreted by a different RA. In such a case, installing a new RA may result in the loss of information such as, for example, parental blocking choices, in which case any program may become viewable on the user's television. This is often unacceptable to many users (and to many cable operators).

In accordance with the invention, an RA is replaced in one or more STTs by transmitting, over an assigned transmission channel (e.g., the BCFS channel), an upgrade channel application (UCA) used to facilitate the roll-out of the new RA. To that end, the cable operator transmits a message identifying one or more STTs in a network that are selected to receive the new RA. The message directs the selected STTs to force-tune to a specified program channel. The selected STTs access updated program channel and service tables and determine that the specified program channel is associated with the assigned transmission channel. The selected STTs then utilize the assigned transmission channel to download the UCA. After a selected STT downloads the UCA, the UCA retrieves the user parameters stored in the STT, and transmits them to a remote location for storage. A new RA is then installed in the STT. Meanwhile, the user parameters are converted, at the remote location, to be compatible with the new RA. After the new RA is installed in the STT, the UCA retrieves the converted user parameters from the remote location, and stores them in the STT memory for exploitation by the new RA.

The present invention is applicable, in accordance with one implementation, where a cable operator conducts a full roll-out of a new RA. In this implementation, the operator selects all or substantially all of the STTs in a network to receive the new RA. Accordingly, the operator broadcasts the UCA to all or substantially all of the STTs in the network. The UCA, executing on each respective STT, retrieves user parameters from the STT memory and transmits them to the operator's headend facility for storage. The user parameters for each respective STT are stored and indexed based on identifying information associated with the respective STT. The operator then installs the new RA on each of the STTs in the network. Meanwhile, the stored user parameters are converted to be compatible with the new RA, and transmitted to the respective STTs. The UCA in each respective STT receives the converted user parameters and stores them in the STT memory.

Because software errors and other problems are sometimes discovered in the process of introducing a new RA, it may be preferable to conduct a trial of a new RA among a limited number of STTs in the network, before installing it on all STTs. If the trial proves successful, the operator may then install the new RA on all the STTs in the network. Accordingly, in another implementation, the invention is applicable where a cable operator selects a limited group of STTs, e.g., STTs 170, for a trial of a new RA. The selected group may comprise a group of associated STTs, e.g., the STTs in the same service area.

In the following discussion, STT 170-1 is used to represent a generic STT within a set of STTs selected to receive a new RA. The set of selected STTs may comprise, for example, all or substantially all of the STTs in network 150 (as in the case of a full roll-out of a new RA). Alternatively, the set may comprise a more limited number of STTs, e.g., STTs 170-1 through STT 170-M (as in the case of a trial of a new RA).

According to an aspect of the invention, the cable operator prepares a UCA, which is designed to read the user parameters stored in an STT's memory and transmit them to the operator's headend facility for storage. The operator installs the UCA on each of the selected STTs by transmitting it over the network from the headend.

Figure 4:
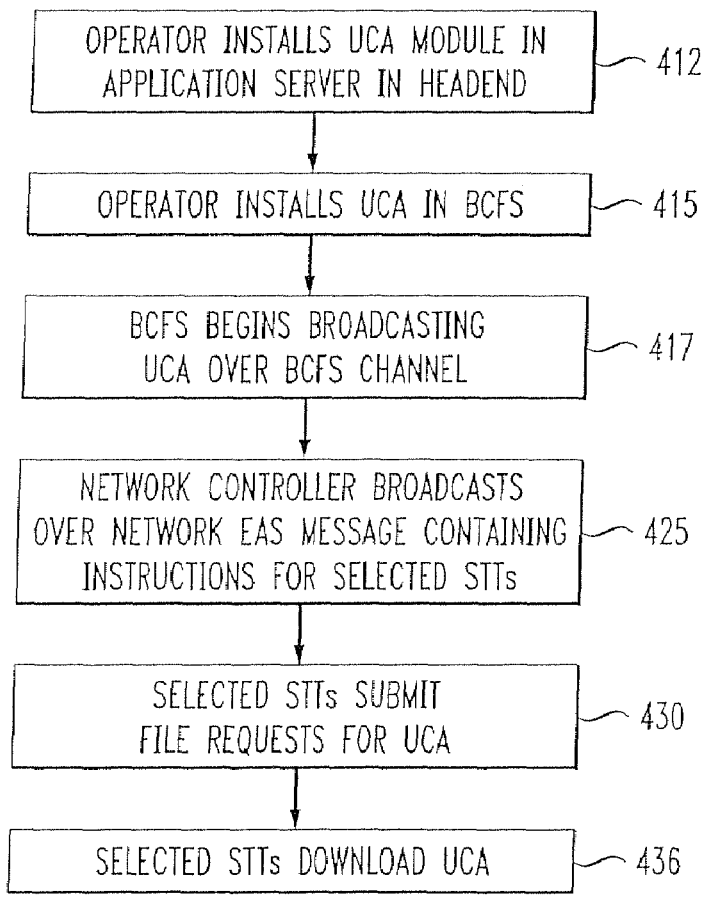
FIG. 4 is a flowchart illustrating a process for broadcasting an upgrade channel application to set-top terminals in a cable network.

FIG. 4 shows a flowchart depicting various steps performed in carrying out this aspect of the invention. At step 412, the cable operator installs in application server 220 a software module designed to receive and store user parameters from various STTs in network 150. Referring to FIG. 1, UCA module 223 resides in, and executes on, application server 220.

At step 415, the cable operator installs the UCA in BCFS 225. In accordance with one implementation, the UCA is installed in BCFS 225 in the following manner. Referring to step 417, BCFS 225 begins broadcasting the UCA, in a cyclical fashion, over the BCFS channel. In addition, the cable operator installs in BCFS 225 updated program channel and service tables in which the UCA is associated with a specified remote BCFS file download service (i.e., the UCA is a file that needs to be downloaded from BCFS 225). Furthermore, the updated program channel and service tables associate the remote download service with a specified program channel, e.g., program channel 16 in program channel table 601. BCFS 225 begins broadcasting the updated program channel and service tables over the BCFS channel.

At step 425, network controller 210 transmits an Emergency Alert System (EAS) message over network 150 to selected STTs in accordance with the invention. In prior art, an EAS message carries instructions to one or more STTs to override the normal programming on a selected channel and play a specified audio and video message, which may be a text message or video crawl. Specified cable systems are required by law to include EAS equipment that is capable of providing EAS messages on all programmed channels. However, in accordance with the invention, the EAS message here (although formatted and disseminated similarly to a prior art EAS message) carries instructions for one or more selected STTs to "force-tune" to a specified program channel, e.g., program channel 16. In order to tune to, or access, the specified program channel, a selected STT first looks up the service associated with the specified program channel in the program channel and service tables, e.g., those of FIG. 2. In this instance, the program and service tables associate specified program channel with the aforementioned remote UCA download service. Not to interfere with the normal function of a EAS message, i.e., conveying emergency information, the inventive EAS message is of the type accorded the lowest priority available in the EAS message system.

In this instance, the EAS message also contains data identifying selected STTs, e.g., STT 170-1, to which the message is intended. For example, the MAC address of STT 170-1 may be included in the EAS message to identify the intended recipient STT 170-1. In an alternative implementation, an IP address of the STT is used as the identifier, instead. Other methods for identifying the selected STTs are possible. If the operator is conducting a trial of a new RA, only the STTs selected for trial are identified in the EAS message. Alternatively, if the operator is conducting a full roll-out of a new RA, all or substantially all of the STTs in the network may be identified.

In the implementation used to conduct a trial of a new RA, any STT not selected for the trial receives the EAS message, does not find its identifier and, accordingly, ignores the instructions carried in the EAS message. In this example, STT 170-1 receives the EAS message, recognizes its identifier and processes the instructions to tune to program channel 16. STT 170-1 consults the program channel and service tables and (referring to FIG. 2) determines that program channel 16 is associated with a file download parameter in table 605-K. In this instance, the file download parameter specifies a remote BCFS file download service which provides access to the UCA. Accordingly (referring to step 430), STT 170-1 transmits to controller 210 via an RDC a file request for the UCA furnished by BCFS 225. Controller 210 responds by providing to STT 170-1 information indicating the directory location of the UCA on the BCFS channel. STT 170-1 tunes to the BCFS channel. All other selected STTs similarly submit UCA requests and receive the directory location information concerning the UCA.

At step 436, STT 170-1 downloads the UCA from the BCFS channel. The UCA is stored in memory 210 within STT 170-1. At the same time, all other selected STTs download and store the UCA. Referring to FIG. 3, UCA 455 resides in memory 210 and executes on STT 170-1.

According to a second aspect of the invention, once UCA 455 is operating in STT 170-1, UCA 455 communicates with application server 220 over network 150. Specifically, UCA 455 retrieves one or more user parameters from memory 210 and transmits them to application server 220. Application server 220 stores the user parameters in memory 222.

Figures 5, 6:
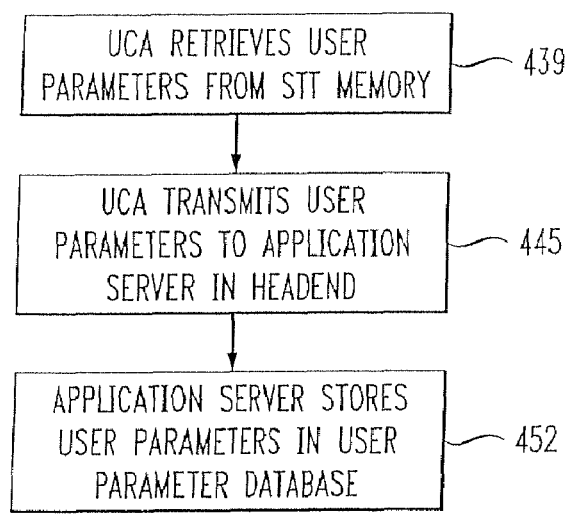
FIG. 5 is a flowchart illustrating a process for retrieving user parameters from a set-top terminal and transmitting them to a headend facility.
FIG. 6 illustrates a data packet containing user parameters from a set-top terminal.

FIG. 5 is a flowchart depicting various steps carried out in performing this aspect of the invention. At step 439, UCA 455 reads from memory 210 the existing user parameters compatible with the RA to be replaced. At step 445, UCA 455 transmits the user parameters over network 150 to application server 220.

In one implementation, UCA 455 transmits the user parameters in packet form to application server 220 over an RDC, in accordance with a Trivial File Transfer Protocol (TFTP). FIG. 6 is a schematic illustration of a data packet 428 that may be used to transmit to headend 120 the user parameters retrieved from the memory of STT 170-1. In the example illustrated in FIG. 6, a first field 440 carries data indicating the MAC address associated with STT 170-1. A plurality of additional fields 441-444 carry data representing the user parameters. Field 441 may contain, e.g., data relating to user choices regarding parental-blocking of channels. Similarly, field 442 may contain data relating to network services received via STT 170-1. Field 443 may contain data relating to the user's favorite channels. Field 444 may contain data indicating the user's favorite times for recording program materials. It should be noted that although for purposes of illustration, four user parameter fields are shown, packet 428 may comprise any number of user parameter fields.

Returning to FIG. 5, at step 452, application server 220 stores the one or more user parameters in a user parameter database maintained in memory 222. In one implementation, this function is performed by UCA module 223.

In this instance, the user parameters from STT 170-1 are indexed and stored based on the MAC address of STT 170-1. FIG. 7 illustrates the data structure of a user parameter database 540 that may be used by UCA module 223 to store user parameters retrieved from various STTs. User parameter database 540 includes one or more user files each corresponding to a respective STT. Each row in user parameter database 540 corresponds to a single STT record. Each STT record comprises a plurality of fields, each of which carries information pertaining to the respective STT. The user parameter database is structured so that a given STT record may be indexed, identified and retrieved based on the MAC address associated with the respective STT. Referring to FIG. 7, user parameter database 540 comprises five STT records 560A-E. Column 573 holds MAC addresses for various STTs. Columns 574-577 hold user parameters for each respective STT. For example, STT record 560A may store data relating to STT 170-1. In this example, the first field (column 573) of STT file 560A holds data representing the MAC address of STT 170-1. Four additional fields hold data representing various user parameters associated with STT 170-1, e.g., user parameter data indicating user choices regarding parental-blocking of channels, parameters pertaining to services received via STT 170-1, parameters relating to the user's favorite channels, and parameters relating to the user's favorite recording times. It should be noted that the user parameter database 540 shown in FIG. 7 is intended for illustrative purposes only. In other implementations, a user parameter database may comprise any number of STT records, and an STT record may comprise any number of user parameter fields.

In accordance with a third aspect of the invention, the user parameters received from STTs are converted to a version of the user parameters compatible with a new RA, the new RA is installed in an STT, application server 220 transmits the converted user parameters back to the STT, and the converted user parameters are stored in the STT memory.

Figure 8:
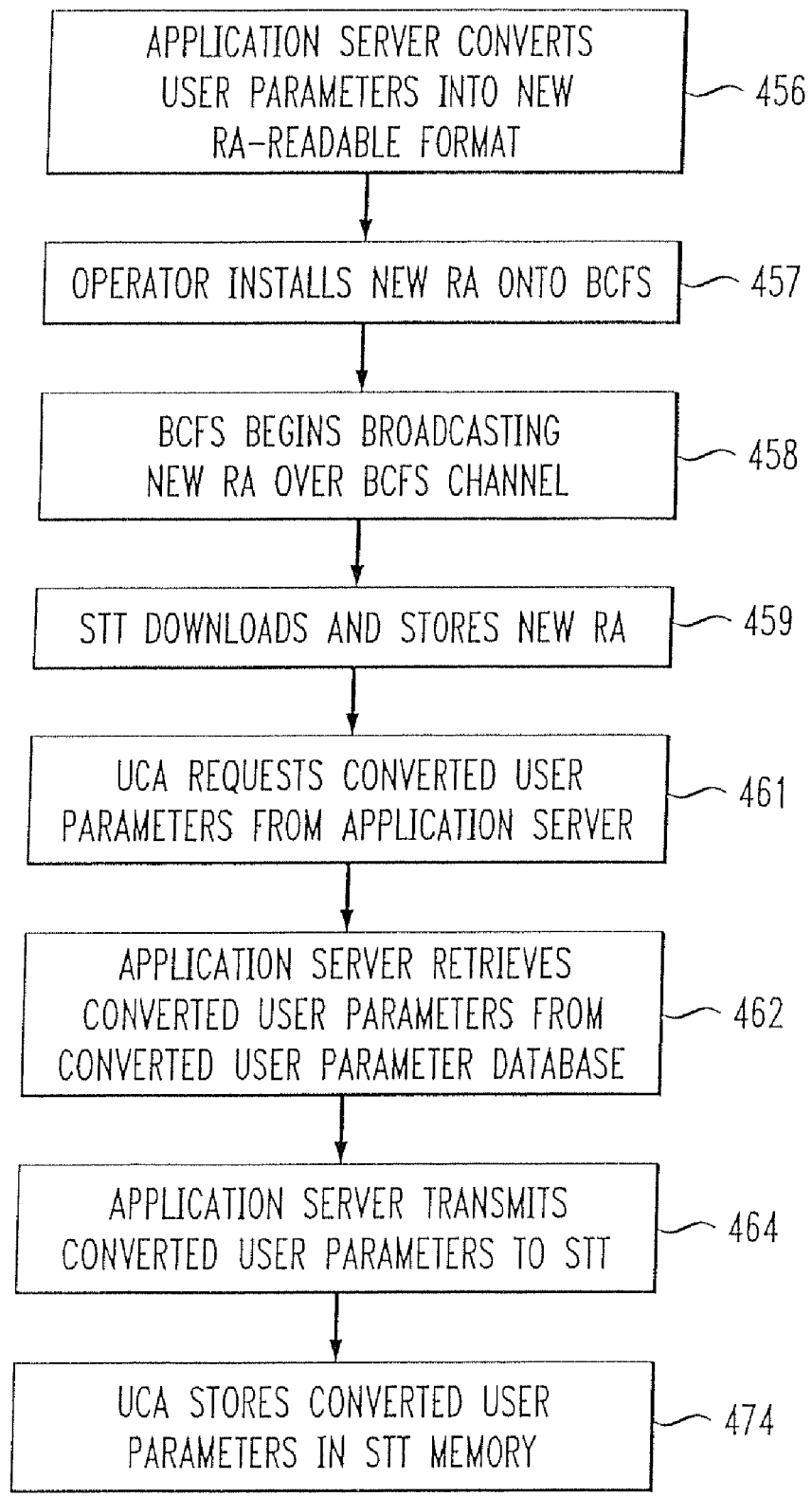
FIG. 8 is a flowchart illustrating a process for installing a new resident application, and converted user parameters in a set-top terminal.

FIG. 8 is a flowchart depicting various steps carried out to perform this aspect of the invention. At step 456, application server 220 converts the one or more user parameters to parameters recognizable by the new RA and stores the converted user parameters. In one implementation, the conversion is performed by UCA module 223. To store the converted user parameters, UCA module 223 may generate a converted user parameter database, similar to the user parameter database 540 shown in FIG. 7, to store the converted user parameters. Alternatively, UCA module 223 may generate a single, integrated database for storing both the original user parameters and the converted user parameters.

Referring to step 457, the cable operator installs the new RA on BCFS 225. At step 458, BCFS 225 broadcasts cyclically the new RA over the BCFS channel. At step 459, STT 170-1 downloads and stores the new RA. Under control of the UCA, STT 170-1 submits a file request for the new RA to controller 210. Controller 210 responds by providing to STT 170-1 the directory address of the new RA on the BCFS broadcast. The UCA retrieves the new RA from the BCFS channel and stores the new RA in memory 210. Once installed on STT 170-1, the new RA begins to execute.

When the new RA initializes on STT 170-1, UCA 455 may be erased partially or entirely from memory 210. Therefore, STT 170-1 may download another copy of the UCA 455 into memory 210. Referring to FIG. 3, UCA 455 again resides in memory 210 and executes on STT 170-1.

At step 461, UCA 455 requests from application server 220 the converted user parameters associated with STT 170-1. At step 462, application server 220 retrieves from storage the converted user parameters associated with STT 170-1. In one implementation, this function may be performed by UCA module 223. Accordingly, in this implementation, UCA module 223 locates the converted user parameters for STT 170-1 in the converted user parameter database, based on the MAC address of STT 170-1. At step 464, application server 220 transmits the converted user parameters to STT 170-1. In accordance with one implementation, the converted user parameters are transmitted over the FDC. At step 474, UCA 455 stores the converted user parameters in memory 210.

In an alternative implementation, user parameters are not transmitted to headend 120 for storage. Instead, in this implementation, the conversion function of UCA module 223 may be performed by UCA 455. Accordingly, UCA 455 is downloaded to STT 170-1, and UCA 455 reads the one or more user parameters from memory 210, converts the one or more user parameters to parameters recognizable by the new RA, and stores the converted user parameters in memory 210. The new RA is then installed on STT 170-1 in the manner described above in steps 457-459 of FIG. 8.

Roll-Back

In accordance with another aspect of the invention, a system and method are utilized for implementing a roll-back, i.e., a re-installation of an RA (the "original RA") that was previously removed from one or more STTs in a network. If the original RA has been replaced by a new RA that is incompatible with the original RA, it may additionally be necessary to re-install the user parameters that were compatible with the original RA (the "original user parameters") and removed from the STT memory.

A roll-back may be desirable for a variety of reasons, such as, for example, where a software error is discovered in a new RA during a trial. In such case, the cable operator prepares a restore channel application (RCA), and installs the original RA and the RCA on the STT. The RCA retrieves the original user parameters from the headend and stores them in the STT memory. In one implementation, the functions of an RCA may be combined with those of a UCA within a single software application.

Figure 9:
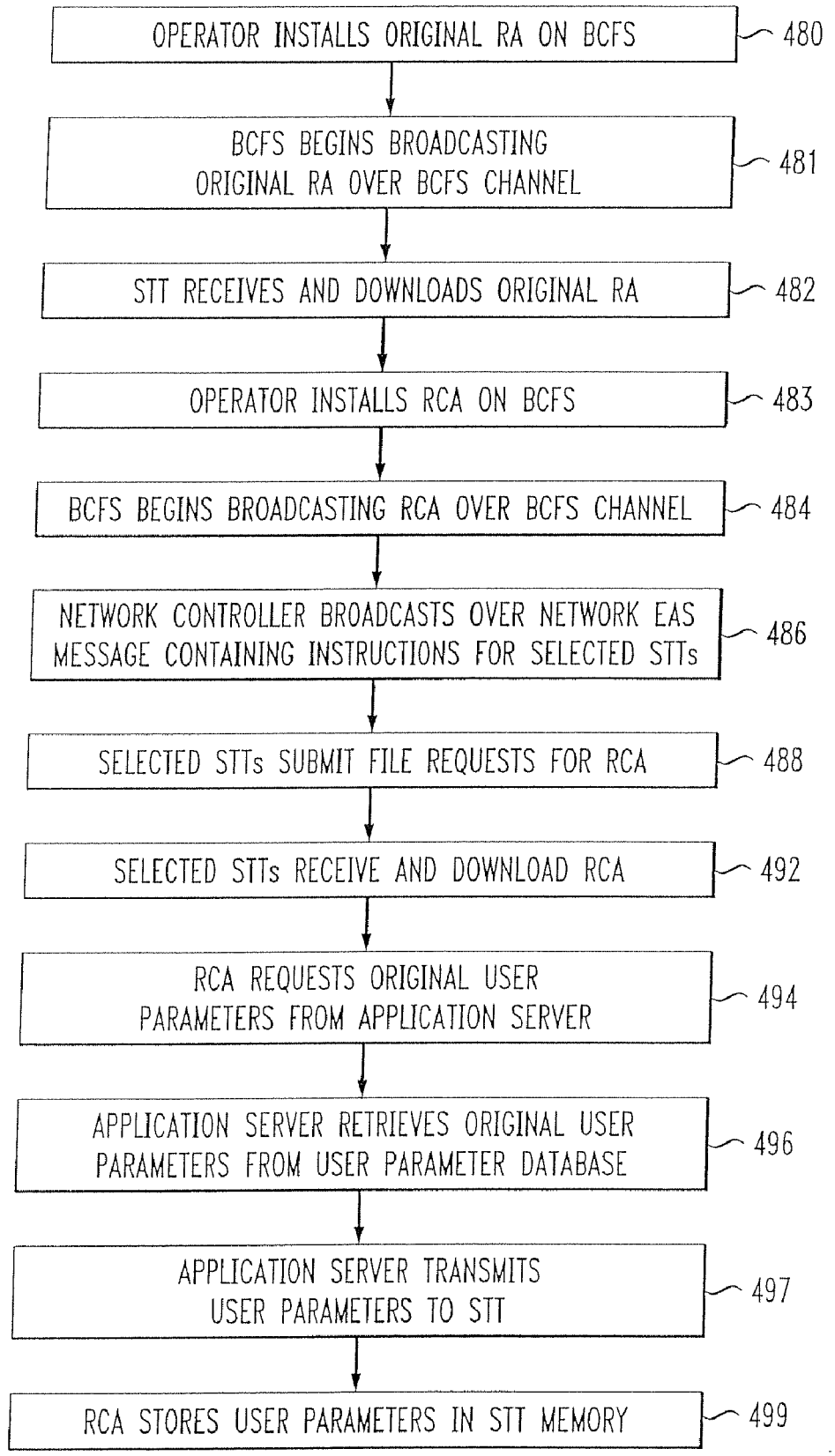
FIG. 9 is a flowchart illustrating a process for implementing a roll-back to a previous resident application.

FIG. 9 is a flowchart depicting various steps performed in carrying out this aspect of the invention. In this discussion, STT 170-1 is again used to represent the STTs selected to receive the previous version of the RA. At step 480, the cable operator installs the original RA onto BCFS 225. At step 481, BCFS 225 begins broadcasting, in a cyclical fashion, the original RA over the BCFS channel. Updated program channel and service tables associating the original RA with a designated service are similarly installed onto BCFS 225. BCFS 225 broadcasts the updated program channel and service tables in the usual manner.

Controller 210 transmits a control message directing the selected STTs to tune to the BCFS channel and download the original RA. STT 170-1 receives the control message, consults the program channel and service tables and, at step 482, receives the original RA from the BCFS channel and downloads it into memory 210.

At step 483, the cable operator installs an RCA on the BCFS 225. Accordingly (referring to step 484), BCFS 225 begins broadcasting, cyclically, the RCA over the BCFS channel. The operator also updates the program channel and service tables to reflect the addition of the RCA. The updated program channel and service tables associate a specified program channel with a remote download service for downloading the RCA from BCFS 225.

At step 486, network controller 210 broadcasts over the network an EAS message carrying information identifying STT 170-1, and the EAS message contains instructions for STT 170-1 to access a specified program channel, in accordance with the invention. In one implementation, the MAC address of each selected STT (e.g., STT 170-1) is included in the EAS message to indicate that each selected STT is an intended recipient. In an alternative implementation, IP addresses are used to identify the selected STTs.

STT 170-1 receives the EAS message, recognizes its identifier and processes the instructions. Similarly, all other selected STTs recognize their identifiers and read the message. In one implementation, pursuant to the EAS instructions to access the specified program channel, STT 170-1 determines from the program channel and service tables that the specified program channel is associated with the aforementioned remote service for downloading the RCA from the BCFS channel. Accordingly, at step 488, STT 170-1 submits a file request for the RCA to controller 210, which responds by providing information indicating the directory location of the RCA on the BCFS broadcast. STT 170-1 tunes to the BCFS channel. At step 492, STT 170-1 receives and downloads the RCA via the BCFS channel. The RCA is stored in memory 210 and executes on STT 170-1.

At step 494, the RCA requests the original user parameters for STT 170-1 from application server 220. In accordance with one implementation, the RCA sends to application server 220, via the RDC, a message containing an identifier for STT 170-1 and a request for original user parameters. In this implementation, a MAC address is used to identify STT 170-1. An alternative implementation uses an IP address as an identifier.

At step 496, application server 220 retrieves the original user parameters associated with STT 170-1 from storage. In accordance with one implementation, application server 220 locates the original user parameters within user parameter database 540 using the MAC address of STT 170-1. In this implementation, this function is performed by an RCA module, analogous to UCA module 223, that resides in application server 220.

At step 497, application server 220 transmits the original user parameters to STT 170-1. In accordance with one implementation, application server 220 transmits the original user parameters over an FDC. In this implementation, application server 220 may transmit the original user parameters in a data packet similar to data packet 428 shown in FIG. 6. At step 499, the RCA receives the original user parameters and stores them in memory 210.

In accordance with yet another aspect of the invention, a cable network operator broadcasts a specially-designed software application, referred to as a parameter backup application (PBA), which may be similar to the UCA described above, to one or more STTs on the network. The PBA, once installed on a respective STT, retrieves user parameters from the STT memory and transmits them to headend for storage. The user parameters are stored in a database at the headend as backup user parameters, and are retrieved in the event an unexpected event causes the loss of the user parameters from the user's STT, or of the STT itself.

As an example, a user may lose his or her STT due to a fire or theft. In accordance with one implementation, the operator may then replace the user's STT with a new device, and install a parameter recovery application (or PRA), which may be similar to the RCA described above, on the user's new STT. In this implementation, the operator may provide to the PRA the MAC address of the user's lost STT. The PRA transmits the lost STT's MAC address to the application server in the headend, and requests the user's original user parameters. The application server in the headend responds by retrieving the original user parameters from storage and transmitting them to the new STT. The new STT stores the original user parameters in memory. By accessing the recovered original user parameters, the new STT is able to function in accordance with the user choices and preferences which the user had previously entered into the lost STT.

The foregoing merely illustrates the principles of the invention. It will thus be appreciated that those skilled in the art will be able to devise numerous other arrangements which embody the principles of the invention and are thus within its spirit and scope.

For example, the invention is applicable to an update of a resident application not only in a set-top terminal described above, but also in any device connectible to a communications network, e.g., a multi-channel cable network. In particular, one such device may be a host device which runs, e.g., on an OpenCable Applications Platform (OCAP), and which may be sold in retail outlets, e.g., digital television sets or other consumer products for receiving cable services. The OCAP enables developers to design host devices interoperable across cable systems in North America. For details on the functional requirements of one such host device, one may refer, e.g., to: "OpenCable™ Host Device Core Functional Requirements," OC-SP-HOSR-CFR-I13-030707, Cable Television Laboratories, Inc., Jul. 7, 2003. The host devices have a common interface to a point-of-deployment (POD) module. For details on such an interface, one may refer, e.g., to: "OpenCable™ HOST-POD Interface Specification," OC-SP-HOSTPOD-IF-I13-030707, Cable Television Laboratories, Jul. 7, 2003. The POD module, comprising a PCMCIA device, can be inserted into the host device, allowing a viewer to receive cable systems' secure digital video services, e.g., premium subscription channels, video-on-demand (VOD) services, etc. Specifically, the POD module contains conditional access functionality, as well as the capability of converting messages to a common format. Thus, the POD module provides a cable operator with a secure device at the user premises, and acts as a translator so that the host device needs to understand a single protocol, regardless of the type of the network to which it is connected. It will also be appreciated that where a resident application is installed in a POD module, the invention equally applies to an update of such a resident application in the POD module.

In addition, in the embodiment shown in FIG. 1, the network transport is illustratively realized using HFC cable network 150. However, other networks such as digital subscriber line (DSL) networks, ethernet networks and satellite networks may be used, instead.

Finally, the system illustrated in FIG. 1 and STT in FIG. 3 are disclosed in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for replacing a first application stored in a user terminal with a second application through a multi-channel delivery network, comprising:

transmitting to the user terminal a message used to force the user terminal to tune to a selected program channel, which is associated with information concerning the user terminal's obtaining a third application through the multi-channel delivery netwrok;

receiving from the user terminal a request for the third application based on the informationl; and in response to the request, providing to the user terminal the third application which when executed by the user terminal controls the user terminal to transmit a first version of user parameters to a remote location;

receiving at the location remote from the user terminal the first version of one or more user parameters which is associated with the first application and stored in the user terminal, the user parameters in the first version helping to realize the first application in accordance with user preferences;

storing at the remote location the first version of user parameters in association with an identifier of the user terminal;

converting the first version of user parameters to a second version of user parameters, the second version of user parameters being compatible with the second application and helping to realize the second application in accordance with the user preferences;

installing the second application, in lieu of the first application, in the user terminal; and providing the second version of the user parameters to the user terminal through the multi-channel delivery network.

2. The method of claim 1, wherein the network includes a hybrid fiber coaxial (HFC) cable network.

3. The method of claim 1 wherein the user terminal includes a device for receiving cable TV services.

4. The method of claim 3, wherein the device includes a set-top terminal.

5. The method of claim 3, wherein at least one of the first and second applications includes a resident application in the device.

6. The method of claim 3, wherein the identifier includes a media access control (MAC) address of the device.

7. The method of claim 3, wherein the identifier includes an Internet protocol (IP) address of the device.

8. The method of claim 3, wherein the remote location includes a cable network headend facility.

9. The method of claim 3, wherein the user parameters specify a user's parental blocking preferences.

10. The method of claim 1, wherein the message is formatted in accordance with an emergency alert system (EAS) message format.

11. The method of claim 10, wherein the message used to force the user terminal to access a selected program channel includes an identifier corresponding to the user terminal to which the message is directed, said identifier being one of a MAC address and an IP address sufficient to distinguish said user terminal from other user terminals to which the message is not directed.

12. A method for use in updating a user terminal through the use of an update application and multi-channel delivery network, the user terminal including a database for associating at least one program channel in a plurality of channels supported by said multi-channel delivery network with at least one service, the method comprising:

transmitting to the user terminal a message used to force the user terminal to tune to the at least one program channel specified by the message and thereby cause the user terminal, to consult the database to obtain information corresponding to the at least one service associated with the at least one program channel;

supplying the update application to said user terminal over said at least one program channel of the multi-channel delivery network to which said message forces the user terminal to tune; and receiving parameters from said user terminal transmitted as a result of execution of said update application; and storing parameters received from the user terminal following execution of said update application.

13. The method of claim 12, wherein the message is formatted in accordance with an EAS message format.

14. The method of claim 12, further comprising:

downloading to the user terminal a new resident application.

15. The method of claim 14, further comprising:

downloading a set of converted parameters to the user terminal to be used with said new resident application, said converted parameters having been generated by converting at least some of said stored parameters to parameters recognizable by the new resident application.

16. The method of claim 15, wherein said message has a message type which is the lowest priority of a plurality of possible EAS message priorities; and wherein the user terminal is a set-top terminal.

17. The method of claim 15, wherein the network includes an HFC cable network.

18. A method for updating an application in a user terminal for receiving entertainment programming content through a multi-channel delivery network, the application being associated with one or more parameters which specify preferences concerning receipt of the entertainment programming content, the method comprising:

transmitting to the user terminal a message used to force the user terminal to tune to a selected program channel of the multi-channel delivery network, which is associated with information concerning an application used to control the user terminal to transmit parameters through the multi-channel delivery network as part of the application update operation;

transmitting to the user terminal, via the selected program channel, said application used to control the user terminal to transmit parameters through the multi-channel delivery network as part of the application update operation;

receiving from the user terminal the parameters through the multi-channel delivery network;

storing the received parameters in association with an identifier of the user terminal;

deriving, from the received parameters, a version of the parameters which is compatible with an updated version of the application;

updating the application in the user terminal with the updated version of the application; and providing the derived version of the parameters to the terminal through the multi-channel delivery network.

19. The method of claim 18, wherein the user terminal includes a set-top terminal for receiving cable TV services.

20. The method of claim 19, wherein the application includes a resident application in the set-top terminal.

21. The method of claim 19, wherein the identifier includes a MAC address of the set-top terminal.

22. The method of claim 19, wherein the identifier includes an IP address of the set-top terminal.

23. The method of claim 18, wherein the preferences include a user's parental blocking preferences.

24. The method of claim 18, wherein the preferences include a user's favorite program preferences.

25. A system for replacing a first application stored in a user terminal with a second application through a multi-channel delivery network, comprising:
- a device for transmitting to the user terminal a message directing the user terminal to tune to a selected program channel, which is associated with information concerning the user terminal's obtaining a third application through the selected program channel of the multi-channel delivery network, a request for the third application based on the information being received from the user terminal, the third application being provided to the user terminal in response to the request, wherein the third application facilitates transmission of a first version of user parameters to a remote location through the selected program channel of the multi-channel delivery network;
- an interface for receiving at the location remote from the user terminal the first version of one or more user parameters which is associated with the first application and stored in the user terminal, the user parameters in the first version helping to realize the first application in accordance with user preferences;
- a storage for storing at the remote location the first version of user parameters in association with an identifier of the user terminal;
- a server for converting the first version of user parameters to a second version of user parameters, the second version of user parameters being compatible with the second application and helping to realize the second application in accordance with the user preferences; and
- a mechanism for installing the second application, in lieu of the first application, in the user terminal; the second version of the user parameters being provided to the user terminal through the multi-channel delivery network.

26. The system of claim 25, wherein the network includes an HFC cable network.

27. The system of claim 25, wherein the user terminal includes a device for receiving cable TV services.

28. The system of claim 27, wherein the device includes a set-top terminal.

29. The system of claim 27, wherein at least one of the first and second applications includes a resident application in the device.

30. The system of claim 27, wherein the identifier includes a MAC address of the device.

31. The system of claim 27, wherein the identifier includes an IP address of the device.

32. The system of claim 27, wherein the remote location includes a cable network headend facility.

33. The system of claim 27, wherein the user parameters specify a user's parental blocking preferences.

34. The system of claim 27, wherein the user parameters specify a user's favorite program preferences.

35. The system of claim 25, wherein the message is formatted in accordance with an EAS message format.

36. The system of claim 25, wherein a table is used to associate the selected program channel with the information.

37. A system for providing an application, through a multi-channel delivery network, to a user terminal, which receives programming content attributed to a plurality of program channels, the user terminal including a database for associating at least one program channel with at least one service, the system comprising:
- a device for transmitting to the user terminal a message forcing the user terminal to tune to the at least one program channel specified by the message, thereby causing the user terminal to consult the database to obtain information corresponding to the at least one service associated with the at least one program channel;
- an interface for receiving from the user terminal a request for the at least one service; and
- a server responsive to the request for facilitating access by the user terminal to the application through at least one of the program channels of the multi-channel delivery network.

38. The system of claim 37, wherein the message is formatted in accordance with an EAS message format.

39. The system of claim 37, wherein the database includes at least one of program channel and service tables.

40. The system of claim 37, wherein the network includes an HFC cable network.

41. The system of claim 37, wherein the user terminal includes a device for receiving cable TV services.

42. The system of claim 41, wherein the device includes a set-top terminal.

43. A system for updating an application in a terminal for receiving entertainment programming content through a multi-channel delivery network, the application being associated with one or more parameters which specify preferences concerning receipt of the entertainment programming content, the system comprising:
- a device for transmitting to the user terminal a message used to force the user terminal to tune to a selected program channel of the multi-channel delivery network, which is associated with information concerning an application used to control the user terminal to transmit parameters through the multi-channel delivery network as part of the application update operation, said application being transmitted to the user terminal, via the selected program channel;
- an interface for receiving from the terminal the parameters through the multi-channel delivery network;
- a storage for storing the received parameters in association with an identifier of the terminal;
- a server for deriving, from the received parameters, a version of the parameters which is compatible with an updated version of the application; and
- a mechanism for updating the application in the terminal with the updated version of the application, the derived version of the parameters being provided to the terminal through the multi-channel delivery network.

44. The system of claim 43, wherein the terminal includes a set-top terminal for receiving cable television.

45. The system of claim 44, wherein the application includes a resident application in the set-top terminal.

46. The system of claim 44, wherein the identifier includes a MAC address of the set-top terminal.

47. The system of claim 44, wherein the identifier includes an IP address of the set-top terminal.

48. The system of claim 43, wherein the preferences include a user's parental blocking preferences.

49. The system of claim 43, wherein the preferences include a user's favorite program preferences.

50. The method of claim 10, wherein said message has a message type which is the lowest priority of a plurality of possible EAS message priorities.

* * * * *